US011685223B2

(12) United States Patent
Kumar et al.

(10) Patent No.: US 11,685,223 B2
(45) Date of Patent: *Jun. 27, 2023

(54) CLIMATE CONTROL METHOD FOR MOTOR VEHICLE WITH REMOVABLE ROOF AND SIDE DOORS

(71) Applicant: FORD GLOBAL TECHNOLOGIES, LLC, Dearborn, MI (US)

(72) Inventors: Mukesh Kumar, Canton, MI (US); Lawrence C. Karas, New Boston, MI (US); Andrew Dayton Phillips, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

This patent is subject to a terminal disclaimer.

(21) Appl. No.: 17/038,715

(22) Filed: Sep. 30, 2020

(65) Prior Publication Data
US 2021/0008952 A1    Jan. 14, 2021

Related U.S. Application Data

(62) Division of application No. 15/876,784, filed on Jan. 22, 2018, now Pat. No. 10,821,799.

(51) Int. Cl.
*B60H 1/00*    (2006.01)

(52) U.S. Cl.
CPC ....... *B60H 1/00028* (2013.01); *B60H 1/0055* (2013.01); *B60H 1/00407* (2013.01); *B60H 1/00585* (2013.01); *B60H 1/00735* (2013.01)

(58) Field of Classification Search
CPC ............ B60H 1/00028; B60H 1/00407; B60H 1/0055; B60H 1/00585; B60H 1/00735;
(Continued)

(56) References Cited

U.S. PATENT DOCUMENTS 5,003,785 A    4/1991  Petri et al.
5,950,722 A    9/1999  Huetteman
(Continued)

FOREIGN PATENT DOCUMENTS

DE    10342984 B3    4/2005
DE    10342986 B4    3/2008
(Continued)

OTHER PUBLICATIONS

English Machine Translation of DE102016012165A1 dated Apr. 27, 2017.
(Continued)

*Primary Examiner* — Steven B McAllister
*Assistant Examiner* — Charles R Brawner
(74) *Attorney, Agent, or Firm* — Vichit Chea; Price Heneveld LLP (57) ABSTRACT

A climate control system includes a plurality of vent registers, an HVAC unit delivering conditioned air to the plurality of vent registers, a side door status monitoring device and a controller configured to control opening and closing of the plurality of vent registers in response to side door status data provided by the side door status monitoring device. A related climate control method is also provided.

6 Claims, 4 Drawing Sheets

(58) Field of Classification Search
CPC . B60H 1/247; B60H 1/00742; B60H 1/00871
USPC .......................................................... 454/75
See application file for complete search history.

(56) References Cited

U.S. PATENT DOCUMENTS

| | | | |
|---|---|---|---|
| 6,012,295 A * | 1/2000 | Isobe | B60H 1/00864 |
| | | | 62/131 |
| 6,261,173 B1 | 7/2001 | Odebrecht | |
| 6,772,834 B2 | 8/2004 | Iwamoto et al. | |
| 7,075,034 B2 | 7/2006 | Bargheer et al. | |
| 2008/0302878 A1* | 12/2008 | Helms | B60H 1/00764 |
| | | | 454/75 |
| 2012/0142264 A1 | 6/2012 | Sagou et al. | |
| 2016/0137028 A1* | 5/2016 | Trego | B60H 1/00871 |
| | | | 165/203 |

FOREIGN PATENT DOCUMENTS

| | | |
|---|---|---|
| DE | 102016012165 A1 | 4/2017 |
| WO | 1995017314 A1 | 6/1995 |

OTHER PUBLICATIONS

English Machine Translation of DE10342984B3 dated Apr. 14, 2005.
English Machine Translation of DE10342986B4 dated Mar. 20, 2008.

* cited by examiner

ND SIDE DOORS

CLIMATE CONTROL METHOD FOR MOTOR VEHICLE WITH REMOVABLE ROOF AND SIDE DOORS

This application is a division of U.S. patent application Ser. No. 15/876,784 filed on Jan. 22, 2018, now U.S. Pat. No. 10,821,799, the full disclosure of which is incorporated herein by reference.

TECHNICAL FIELD

This document relates generally to the motor vehicle equipment field and, more particularly, to a new and improved climate control system and method specifically adapted for utilization in a motor vehicle equipped with a removable roof and removable side doors.

BACKGROUND

Standard climate control systems are not engineered to effectively and efficiently cool and heat occupants in motor vehicles equipped with an openable or removable roof and removable side doors. For example, when a side door is removed, air flow from the vent registers is substantially altered by changes in air currents brought about by side door removal. As a result, in some instances, conditioned air delivered through the outboard instrument panel vent registers may be sucked outward away from the driver and front seat passenger thereby providing no beneficial comfort effect.

This document relates to a new and improved climate control system particularly tailored to cool and warm motor vehicle occupants in a motor vehicle equipped with an openable or removable roof and removable side doors.

SUMMARY

In accordance with the purposes and benefits described herein, a new and improved climate control system is provided. That climate control system comprises a plurality of vent registers, an HVAC unit delivering conditioned air to the plurality of vent registers, a side door status monitoring device and a controller. The controller is configured to control opening and closing of the plurality of vent registers in response to side door status data provided by the side door status monitoring device.

In one possible embodiment of the climate control system, the plurality of vent registers includes: (a) a driver's side outboard instrument panel vent register, (b) a driver's side center instrument panel vent register, (c) a driver's side floor vent register, (d) a passenger side outboard instrument panel vent register, (e) a passenger side center instrument panel vent register and (f) a passenger side floor vent register. In such an embodiment, the controller may be configured to open and close the various vent registers to provide warming and cooling to occupants of the motor vehicle in the most efficient and effective manner possible depending upon the status of the side doors: that is whether they are in place or removed.

Toward this end the controller may be configured to open the driver's side floor vent register and the passenger side floor vent register and close the driver's side outboard instrument panel vent register, the driver's side center instrument panel vent register, the passenger side outboard instrument panel vent register and the passenger side center instrument panel vent register when the side door status monitoring device detects removal of the side doors and the HVAC unit is in a heating mode.

The climate control system may further include a seat occupant monitoring device. In such an embodiment the controller may be configured to open the driver's side floor vent register and close the driver's side outboard instrument panel vent register, the driver's side center instrument panel vent register, the passenger side floor vent register, the passenger side outboard instrument panel vent register and the passenger side center instrument panel vent register when the side door status monitoring device detects removal of a side door, the seat occupancy monitoring device detects a vacant front passenger seat and the HVAC unit is in a heating mode.

In one or more embodiments of the climate control system, the controller may be configured to open the driver's side outboard instrument panel vent register, the driver's side center instrument panel vent register, the passenger side outboard instrument panel vent register and the passenger side center instrument panel vent register and close the driver's side floor vent register and the passenger side floor vent register when the side door status monitoring device detects removal of a side door and the HVAC unit is in a cooling mode. In embodiments where the climate control system further includes a seat occupancy monitoring device, the controller may be configured to open the driver's side outboard instrument panel vent register and the driver's side center instrument panel vent register and close the driver's side floor vent register, the passenger side outboard instrument panel vent register, the passenger side center instrument panel vent register and the passenger side floor vent register when the side door status monitoring device detects removal of a side door, the seat occupancy monitoring device detects a vacant front passenger seat and the HVAC unit is in a cooling mode.

In still other embodiments of the climate control system the controller may be configured to open the driver's side center instrument panel vent register and close the driver's side outboard instrument panel vent register, the driver's side floor vent register, the passenger side outboard instrument panel vent register, the passenger side center instrument panel vent register and the passenger side floor vent register when the side door status monitoring device detects removal of a side door, the seat occupancy monitoring device detects an occupied front passenger seat and the HVAC unit is in a cooling mode.

Still further, one or more embodiments of the climate control system may include a controller configured to open the driver's side center instrument panel vent register and the passenger side instrument panel vent register and close the driver's side outboard instrument panel vent register, the passenger side outboard instrument panel vent register, the driver's side floor vent register and the passenger side floor vent register when the side door status monitoring device detects removal of a side door, the seat occupancy monitoring device detects an occupied front passenger seat and the HVAC unit is in a cooling mode.

One or more possible embodiments of the climate control system may further include a roof status monitoring device. In such embodiments, the controller may be configured to control opening and closing of the plurality of vent registers in response to roof status data provided by the roof status monitoring device. In still other embodiments of the climate control system, the climate control system may include an ambient temperature monitoring device. In such embodiments the controller may be configured to control opening and closing of the plurality of vent registers in response to ambient temperature data provided by the ambient temperature monitoring device.

In accordance with an additional aspect, a new and improved climate control method is provided for a motor vehicle with a roof and removable side doors. That method may be broadly described as comprising the steps of (a) monitoring, by a side door status monitoring device, removal of one or more of the side doors and (b) configuring a controller to control opening and closing of a plurality of vent registers of the motor vehicle in response to removal of one or more of the side doors.

The climate control method may further include the steps of monitoring, by a roof status monitoring device, removal or opening of the roof and configuring the controller to control opening and closing of the plurality of vent registers of the motor vehicle in response to removal or opening of the roof. In one or more of the many possible embodiments of the climate control method, the method may include the steps of monitoring, by a seat occupancy monitoring device, occupancy of at least a front passenger seat of the motor vehicle and configuring the controller to control opening or closing of the plurality of vent registers of the motor vehicle in response to occupancy of the front passenger seat. Still further, in one or more embodiments of the climate control method, the method may further include the steps of monitoring, by an ambient temperature monitor, ambient temperature and configuring the controller to control opening and closing of the plurality of vent registers of the motor vehicle in response to the ambient temperature.

In one or more embodiments of the climate control method, the method may include the step of configuring the controller to open the driver's side floor vent register and close a driver's side outboard instrument panel vent register, a driver's center instrument panel vent register, a passenger side floor vent register, a passenger side outboard instrument panel vent register and a passenger side center instrument panel vent register when the side door status monitoring device detects removal of a side door, the seat occupancy monitoring device detects a vacant front seat and an HVAC unit of the motor vehicle is in a heating mode.

The climate control method may further include the step of configuring the controller to open the driver's side outboard instrument panel vent register, the driver's side center instrument panel vent register, the passenger side outboard instrument panel vent register and the passenger side center instrument panel vent register and close the driver's side floor vent register and the passenger side floor vent register when the side door status monitoring device detects removal of the side door and an HVAC unit of the motor vehicle is in a cooling mode.

The climate control method may include the step of configuring the controller to open the driver's side outboard instrument panel vent register and the driver's side center instrument panel vent register and close the driver's side floor vent register, the passenger side outboard instrument panel vent register, the passenger side center instrument panel vent register and the passenger side floor vent register when the side door status monitoring device detects removal of a side door and the seat occupancy monitoring device detects a vacant front passenger seat and an HVAC unit of the motor vehicle is in a cooling mode.

The climate control method may further include the step of configuring the controller to open a driver's side center instrument panel vent register and close a driver's side outboard instrument panel vent register, a driver's side floor vent register, a passenger side outboard instrument panel vent register, a passenger side center instrument panel vent register and a passenger side floor vent register when the side door status monitoring device detects removal of a side door, the seat occupancy monitoring device detects a vacant front passenger seat and the HVAC unit of the motor vehicle is in a cooling mode.

Still further, the climate control method may include a step of configuring the controller to open a driver's side center instrument panel vent register and a passenger side center instrument panel vent register and close a driver's side outboard instrument panel vent register, a passenger side outboard instrument panel vent register, a driver's side floor vent register and a passenger side floor vent register when the side door status monitoring device detects removal of a side door, the seat occupancy monitoring device detects an occupied front passenger seat and the HVAC system of the motor vehicle is in a cooling mode.

In the following description, there are shown and described several preferred embodiments of the climate control system and the related climate control method for a motor vehicle with a roof and removable side doors. As it should be realized, the climate system and method are capable of other, different embodiments and their several details are capable of modification in various, obvious aspects all without departing from the climate control system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the climate control system and method and together with the description serve to explain certain principles thereof.

Reference will now be made in detail to the present preferred embodiments of the climate system and method, examples of which are illustrated in the accompanying drawing figures.

DETAILED DESCRIPTION

Figure 1:
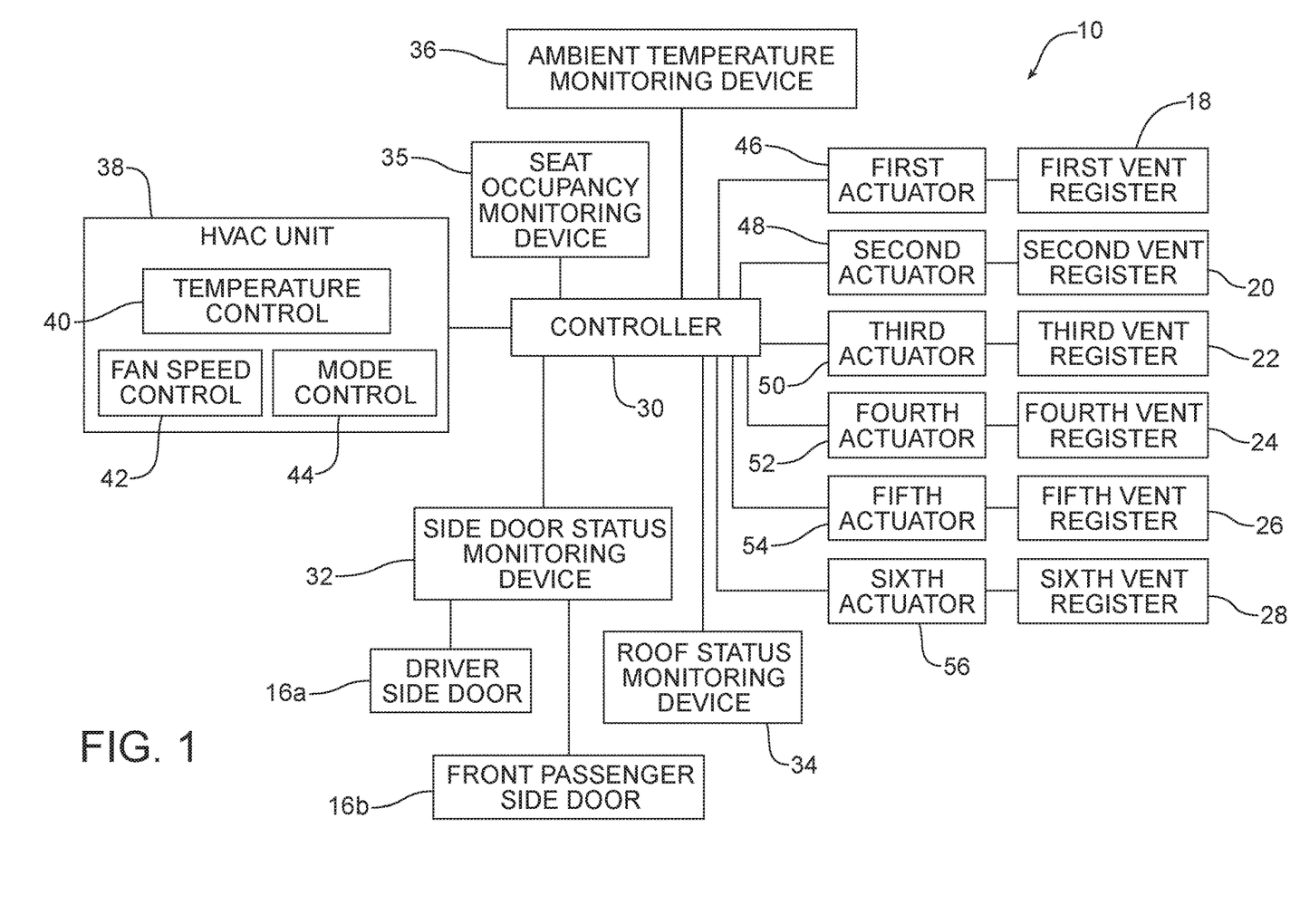
FIG. 1 is a schematic block diagram of the new and improved climate control system for a motor vehicle equipped with an openable or removable roof and removable side doors.
Figure 2:
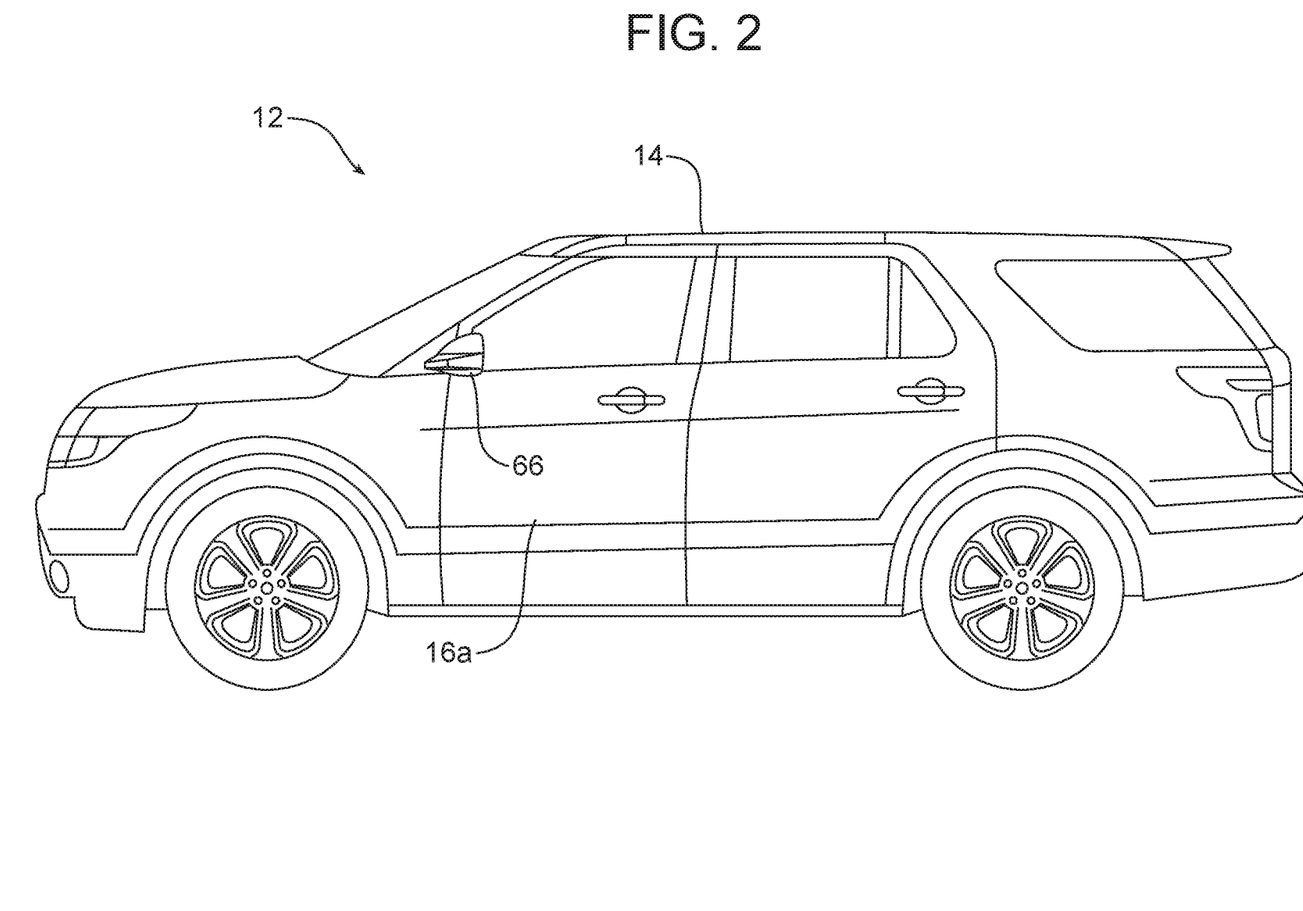
FIG. 2 is a side elevational view of a motor vehicle wherein the removable roof and side doors are installed on the vehicle.
Figure 3:
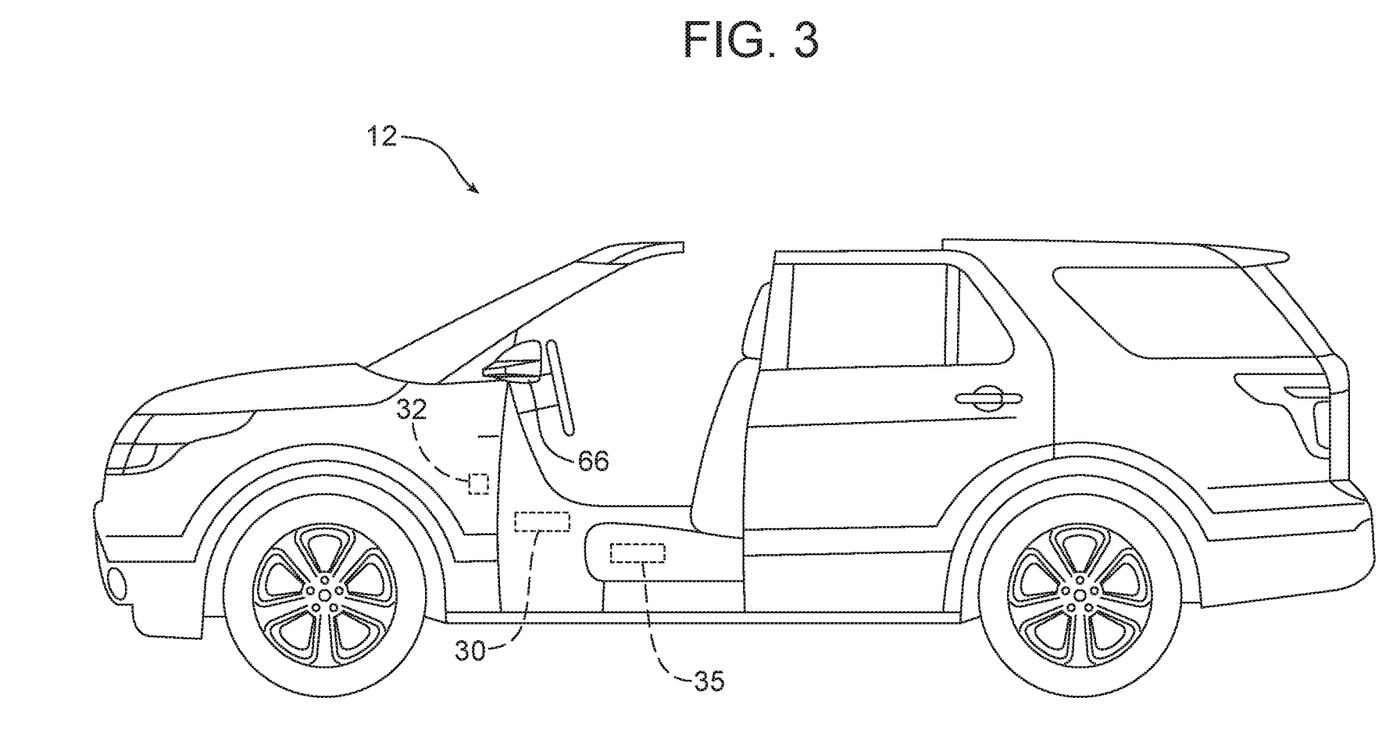
FIG. 3 is a view of the motor vehicle illustrated in FIG. 2 but showing the roof and front side doors removed.

Reference is now made to FIG. 1 which schematically illustrates the new and improved climate control system 10 for a motor vehicle 12 including an openable or removable roof 14 and removable side doors 16a, 16b, 16c (passenger side rear door hidden from view). FIG. 1 illustrates the motor vehicle 12 with the removable roof 14 and removable side doors 16a, 16b, 16c installed and in place in the motor vehicle. FIG. 2 illustrates the motor vehicle 12 with the removable roof 14 and the front removable side doors 16a removed while the rear removable side doors 16c are still shown in place installed on the motor vehicle.

As illustrated in FIG. 1, the climate control system 10 includes a plurality of vent registers 18, 20, 22, 24, 26, 28, an HVAC unit 38, for delivering conditioned air to the plurality of vent registers, and a controller 30.

The controller 30 may comprise a computing device such as a dedicated microprocessor or an electronic control unit (ECU) operating in accordance with instructions from appropriate control software. Thus, the controller 30 may comprise one or more processors, one or more memories and one or more network interfaces all in communication with each other over a communication bus.

In the illustrated embodiment, the controller 30 is connected to various monitoring devices including a side door status monitoring device 32, a roof status monitoring device 34 and an ambient temperature monitoring device 36. The side door status monitoring device 32 is connected to and monitors the presence status of the driver's side door 16a and the front passenger door 16b. In other embodiments, not shown, the side door status monitoring device 32 may be connected to the driver's side rear door 16c and the passenger side rear door (not shown) in the event the motor vehicle 12 includes removable rear doors. As further illustrated in FIG. 1, the controller 30 may also be connected to the HVAC unit 38 that provides conditioned air to the various vent registers 18, 20, 22, 24, 26, 28. That HVAC unit 38 may include a temperature control 40 for controlling the temperature of the conditioned air being delivered to the various vent registers 18, 20, 22, 24, 26, 28, a fan speed control 42 for controlling the force or speed of the air being delivered through the various vent registers and a mode control 44 to switch the HVAC unit between a cooling mode, a ventilating mode and a heating mode. The temperature control 40, fan speed control 42 and mode control 44 may be directly connected to the controller 30 or may be connected to another controller (not shown) that is connected to the controller 30 by a communication bus.

As further illustrated in FIG. 1, the climate control system 10 also includes a first actuator 46 connected to the first vent register 18, a second actuator 48 connected to the second vent register 20, a third actuator 50 connected to the third vent register 22, a fourth actuator 52 connected to the fourth vent register 24, a fifth actuator 54 connected to the fifth vent register 26 and a sixth actuator 56 connected to the sixth vent register 28. These actuators, 46, 48, 50, 52, 54, 56 open and close the respective vent registers 18, 20, 22, 24, 26, 28 in response to control signals from the controller 30 so as to allow for or prevent conditioned air to pass through the vent registers. Advantageously, the controller 30 functions through the actuators 46, 48, 50, 52, 54, 56 to allow for independent control of the delivery of conditioned air from the HVAC unit 38 through the vent registers 18, 20, 22, 24, 26, 28.

Figure 4:
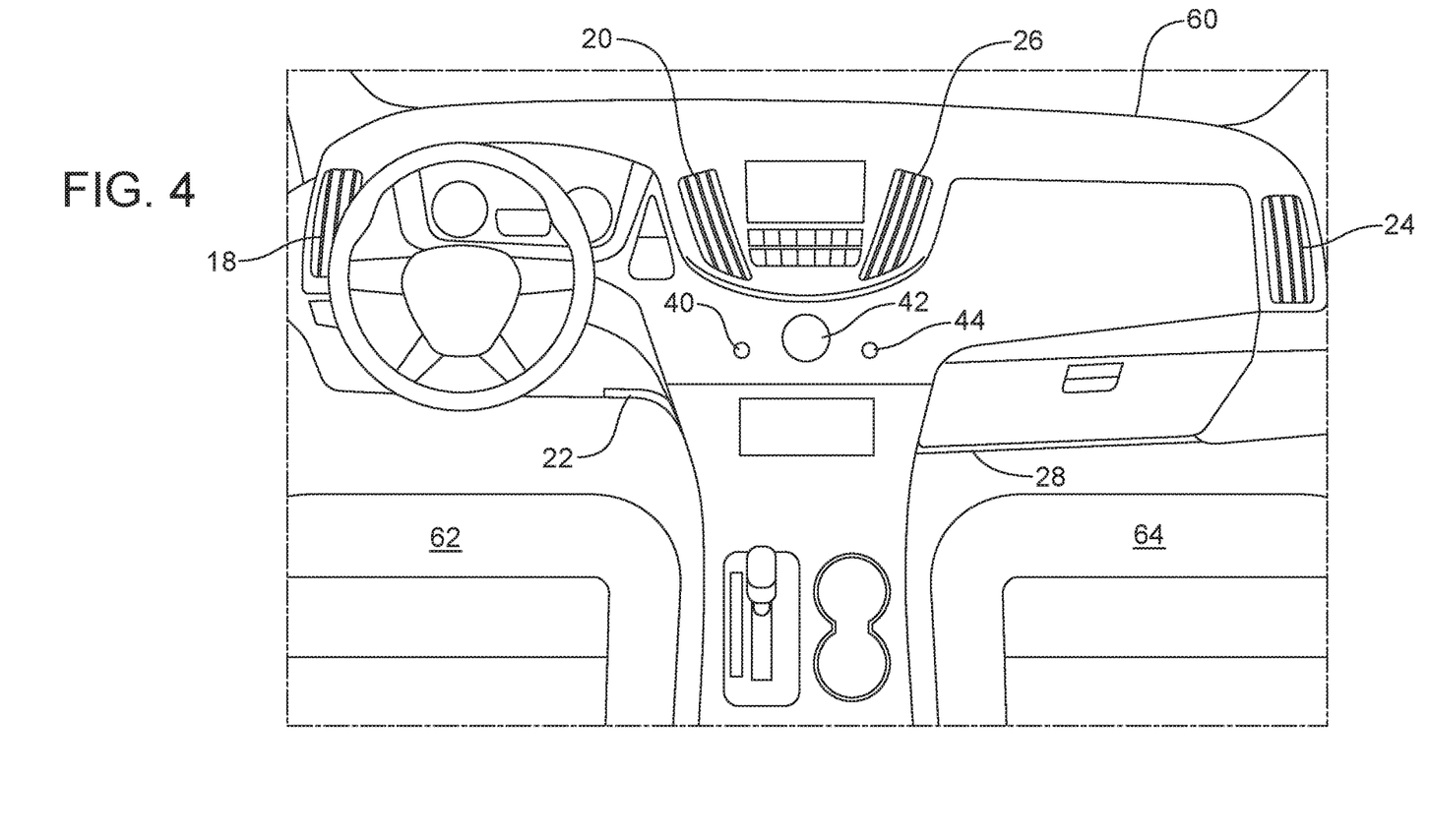
FIG. 4 is a schematic illustration of the interior of the motor vehicle illustrated in FIGS. 1 and 2 and showing a plurality of vent registers by which the climate control system delivers conditioned air from an HVAC unit to the interior of the motor vehicle to warm or cool occupants of the driver's seat and passenger seat.

For purposes of the description that follows, the first vent register 18 is the driver side outboard instrument panel vent register, the second vent register 20 is the driver side center instrument panel vent register, the third register 22 is the driver side floor vent register, the fourth register 24 is the passenger side outboard instrument panel vent register, the fifth register 26 is the passenger side center instrument panel vent register and the sixth register 28 is the passenger side floor vent register. FIG. 4 illustrates the positions of the first vent register 18, the second vent register 20, the third vent register 22, the fourth vent register 24, the fifth vent register 26, and the sixth vent register 28 along the instrument panel 60 of the motor vehicle forward of the driver's seat 62 and the front passenger seat 64.

The controller 30 is configured to control the flow of conditioned air from the HVAC unit 38 through the various vent registers 18, 20, 22, 24, 26, 28 depending upon the operating mode of the HVAC unit as set by the mode control 44, the presence status of the front driver's side door 16a and front passenger side door 16b as indicated by the side door status monitoring device 32, the status of the openable or removable roof 14 as indicated by the roof status monitoring device 34 and the ambient temperature as indicated by the ambient temperature monitoring device 36. The configuration of the controller for operating the climate control system 10 when the removable roof 14 and the removable driver's side door 16a and front passenger side door 16b are secured in place on the motor vehicle as illustrated and FIG. 1 is not relevant to the present description and, accordingly, will not be described in detail. The climate control system 10 however is useful in a climate control method for a motor vehicle equipped with an openable or removable roof 14 and removable side doors 16a, 16b, 16c. That method may be broadly described as comprising the steps of monitoring, by the side door status monitoring device 32, removal of one or more of the side doors 16a, 16b, 16c and configuring the controller 30 to control opening and closing of the plurality of vent registers 18, 20, 22, 24, 26, 28 in response to removal of one or more of the side doors. Further, the climate control method may include monitoring, by the roof status monitoring device 34, removal or opening of the roof 14 and configuring the controller 30 to control opening and closing of the plurality of vent registers 18, 20, 22, 24, 26, 28 in response to removal or opening of the roof.

Still further, the controller 30 may be connected to a seat occupancy monitoring device 35 adapted or configured to monitor the occupancy of at least the front passenger seat 64. Such a seat occupancy monitoring device may comprise any device appropriate for this purpose including, for example, a camera, a weight sensor, a presence detector or the like. Thus it should be appreciated that the climate control method may also include the step of monitoring, by the seat occupancy monitoring device 35, occupancy of at least the front passenger seat 64 of the motor vehicle 12 and configuring the controller 30 to control opening and closing of the plurality of vent registers 18, 20, 22, 24, 26, 28 in response to occupancy of the front passenger seat. In addition, the method may include the step of monitoring, by the ambient temperature monitoring device 36 ambient temperature in configuring the controller 30 to control opening and closing of the plurality of vent registers 18, 20, 22, 24, 26, 28 of the motor vehicle 12 in response to the ambient temperature.

Toward this end, the controller 30 may be configured to open the third vent register 22 and the sixth vent register 26 and close the first vent register 18, the second vent register 20, the fourth vent register 24 and the fifth vent register 26 when the side door status monitoring device 32 detects removal of a side door 16a and/or 16b and the HVAC unit 38 is in heating mode. In contrast, the controller 30 may be configured to open the third vent register 22 and close the first vent register 18, the second vent register 20, the fourth vent register 24, the fifth vent register 26 and the sixth vent register 28 when the side door status monitoring device 32 detects removal of a side door 16a and/or 16b, the seat occupancy monitoring device 35 detects a vacant front passenger seat 64 and the HVAC unit 38 is in a heating mode.

Still further, the controller 30 may be configured to open the first vent register 18, the second vent register 20, the fourth vent register 24 and the fifth vent register 26 and close the third vent register 22 and the sixth vent register 28 when the side door status monitoring device 32 detects removal of a side door 16a and/or 16b and the HVAC unit 38 is in a cooling mode. Still further, the controller 30 may be configured to open the first vent register 18 and the second vent register 20 and close the third vent register 22, the fourth vent register 24, the fifth vent register 26 and the sixth vent register 28 when the side door status monitoring device 32 detects removal of a side door 16a and/or 16b, the seat occupancy monitoring device 35 detects a vacant front passenger seat 64 and the HVAC unit 38 is in a cooling mode.

Some motor vehicles 12 include exterior rearview mirrors 66 that create a vacuum resulting from the aerodynamics of air flowing around the body and rearview mirrors of the motor vehicle when the vehicle is in motion. In such a motor vehicle, when the side doors 16a and 16b are removed, airflow from the outboard instrument panel registers: that is, the first vent register 18 and the fourth vent register 24, may be sucked outside of the passenger compartment away from the driver and passenger. Thus, in this situation any conditioned air directed through the first vent register 18 and the fourth vent register 24 would effectively be wasted. Thus, the controller 30 may also be configured to only open the second vent register 20 and the fifth vent register 26 at the center of the motor vehicle when the seat occupancy monitoring device 35 indicates a driver and passenger are present, the side door status monitoring device 32 indicates the driver's side door 16a and the front passenger side door 16b are removed and the HVAC unit 38 is in cooling mode. In contrast, where the seat occupancy monitoring device 35 indicates a vacant front passenger seat 64 the conditioned air from the HVAC unit 38 would solely be directed through the second vent register 20 toward the driver in the driver's seat 62.

In summary, the climate control system 10 is the first to be configured or especially adapted for utilization in a motor vehicle including removable side doors 16a, 16b. The climate control system 10 provides far more effective and efficient operation in both cooling mode and heating mode in response to the presence or removal of the side doors 16a, 16b. In addition, the controller 30 is configured or adapted to further refine and control the flow of conditioned air from the HVAC unit 38 through the vent registers 18, 20, 22, 24, 26, 28 through independent control of those vent registers by means of the actuators 46, 48, 50, 52, 54, 56. That control is further refined by monitoring and responding to changes in the ambient temperature as monitored by the ambient temperature monitoring device 36, changes in the occupancy of the front seats 62, 64 by monitoring with the seat occupancy monitoring device 35 and removal or presence of the roof 14 as monitored by the roof status monitoring device 34.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A climate control method for a motor vehicle with a roof and removable side doors, comprising:
    receiving side door status data with a controller indicating removal of one or more of said side doors;
    controlling with the controller opening and closing of a plurality of vent registers of said motor vehicle in response to the removal of one or more of said removable side doors;
    receiving roof status with the controller indicating removal or opening of said roof and controlling with said controller the opening and closing of said plurality of vent registers of said motor vehicle in response to removal or opening of said roof;
    receiving seat occupancy data with the controller indicating occupancy of a driver seat and front passenger seat of said motor vehicle and controlling with said controller the opening and closing of said plurality of vent registers of said motor vehicle in response to occupancy of said front passenger seat; and
    performing a control operation with said controller to open a driver side floor vent register and close a driver side outboard instrument panel vent register, a driver side center instrument panel vent register, a passenger side floor vent register, a passenger side outboard instrument panel vent register and a passenger side center instrument panel vent register when said controller detects removal of a side door, said controller detects a vacant front passenger seat and a HVAC unit of said motor vehicle is in a heating mode.

2. The climate control method of claim 1, including monitoring, by an ambient temperature monitor, ambient temperature and configuring said controller to control opening and closing of said plurality of vent registers of said motor vehicle in response to said ambient temperature.

3. A climate control method for a motor vehicle with a roof and removable side doors, comprising:
    receiving side door status data with a controller indicating removal of one or more of said side doors;
    controlling with the controller opening and closing of a plurality of vent registers of said motor vehicle in response to removal of one or more of said removable side doors;
    receiving roof status data with the controller indicating removal or opening of said roof and controlling with said controller the opening and closing of said plurality of vent registers of said motor vehicle in response to removal or opening of said roof;
    receiving seat occupancy data with the controller indicating occupancy of a driver seat and front passenger seat of said motor vehicle and controlling with said controller the opening and closing of said plurality of vent registers of said motor vehicle in response to occupancy of said front passenger seat; and
    performing a control operation with said controller to open a driver side outboard instrument panel vent register, a driver side center instrument panel vent register, a passenger side outboard instrument panel vent register and a passenger side center instrument panel vent register and close a driver side floor vent register and a passenger side floor vent register when said controller detects removal of a side door and an HVAC unit of said motor vehicle is in a cooling mode.

4. A climate control method for a motor vehicle with a roof and removable side doors, comprising:
    receiving side door status data with a controller indicating removal of one or more of said side doors;

controlling with the controller opening and closing of a plurality of vent registers of said motor vehicle in response to removal of one or more of said removable side doors;

receiving roof status data with the controller indicating removal or opening of said roof and controlling with said controller the opening and closing of said plurality of vent registers of said motor vehicle in response to removal or opening of said roof;

receiving seat occupancy data with the controller indicating occupancy of a driver seat and front passenger seat of said motor vehicle and controlling with said controller the opening and closing of said plurality of vent registers of said motor vehicle in response to occupancy of said front passenger seat; and performing a control operation with said controller to open a driver side outboard instrument panel vent register and a driver side center instrument panel vent register and close a driver side floor vent register, a passenger side outboard instrument panel vent register, a passenger side center instrument panel vent register and a passenger side floor vent register when said controller detects removal of a side door, said controller detects a vacant front passenger seat and an HVAC unit of said motor vehicle is in a cooling mode.

5. The climate control method of claim 1, including performing a control operating with said controller to open a driver side center instrument panel vent register and close a driver side outboard instrument panel vent register, a driver side floor vent register, a passenger side outboard instrument panel vent register, a passenger side center instrument panel vent register and a passenger side floor vent register when said controller detects removal of a side door, said controller detects a vacant front passenger seat and an HVAC unit of said motor vehicle is in a cooling mode.

6. The climate control method of claim 1, including performing a control operation with said controller to open a driver side center instrument panel vent register and a passenger side center instrument panel vent register and close a driver side outboard instrument panel vent register, a passenger side outboard instrument panel vent register, a driver side floor vent register and a passenger side floor vent register when said controller detects removal of a side door, said controller detects an occupied front passenger seat and an HVAC unit of said motor vehicle is in a cooling mode.

* * * * *

UNITED STATES PATENT AND TRADEMARK OFFICE
CERTIFICATE OF CORRECTION

| | | |
|---|---|---|
| PATENT NO. | : 11,685,223 B2 | Page 1 of 1 |
| APPLICATION NO. | : 17/038715 | |
| DATED | : June 27, 2023 | |
| INVENTOR(S) | : Mukesh Kumar, Lawrence C. Karas and Andrew Dayton Phillips | |

It is certified that error appears in the above-identified patent and that said Letters Patent is hereby corrected as shown below:

In the Claims

Column 10:
Claim 5, Line 5;
"operating" should be -- operation --

Signed and Sealed this
Seventh Day of November, 2023

Katherine Kelly Vidal
*Director of the United States Patent and Trademark Office*